April 7, 1964 R. C. DICKINSON ETAL 3,128,359

CIRCUIT INTERRUPTERS HAVING ARC EXTINGUISHING MEANS

Filed Jan. 6, 1960 10 Sheets-Sheet 1

WITNESSES

Edwin E. Bassler

Wm. C. Groome

INVENTORS
Robert C. Dickinson
& Russell E. Frink
BY
Willard R. Crout
ATTORNEY

April 7, 1964 R. C. DICKINSON ETAL 3,128,359

CIRCUIT INTERRUPTERS HAVING ARC EXTINGUISHING MEANS

Filed Jan. 6, 1960 10 Sheets-Sheet 2

CIRCUIT INTERRUPTERS HAVING ARC EXTINGUISHING MEANS

Filed Jan. 6, 1960 10 Sheets-Sheet 4

CIRCUIT INTERRUPTERS HAVING ARC EXTINGUISHING MEANS

Filed Jan. 6, 1960

10 Sheets-Sheet 7

3,128,359

CIRCUIT INTERRUPTERS HAVING ARC EXTINGUISHING MEANS

Robert C. Dickinson, Penn Hills Township, Allegheny County, and Russell E. Frink, Forest Hills, Pa., assignors to Westinghouse Electric Corporation, East Pittsburgh, Pa., a corporation of Pennsylvania Filed Jan. 6, 1960, Ser. No. 796
5 Claims. (Cl. 200—144)

This invention relates to circuit interrupters in general, and more particularly to arc-extinguishing structures therefor.

Magnetic air circuit interrupters, as a general class, give the user the maximum economy in installation, maintenance and flexibility of operation. These qualities are particularly desirable in distribution substations. As the size of these substations increases, the advantages of the magnetic-type of interrupter become still more apparent. The rapid growth of metropolitan substations has necessitated the recent development of a 750 mva., 13.8 kv. magnetic circuit interrupter for use in metal-clad switchgear, as described and claimed in United States Patent 2,889,433, issued June 2, 1959, to John M. Kozlovic and Russell E. Frink, and assigned to the assignee of the instant application.

The size of metropolitan substations has continued to increase until the rating, above specified, is no longer adequate for the present demand. In the short period of approximately two years, the 750 mva. rating has become inadequate to meet the still-increasing needs of the industry. Consequently, it has become desirable to develop circuit interrupters of a magnetic air type having the unprecedented rating of 1,000 mva. at 13.8 kv. and of compact size.

It is relatively easy to build an air circuit interrupter for any conceivable interrupting rating, both as to mva. and voltage, provided that no particular space limitations are imposed upon the design. The essence of the art of circuit-interrupter development consists essentially in designing to meet economically acceptable space requirements.

It is a general object of the present invention to provide an improved magnetic air circuit interrupter, which will be able to quickly extinguish the arcs associated with very high fault currents, and yet be of minimum size.

Another object of the present invention is to provide an improved circuit interrupter of the magnetic air-break type, which will have an interrupting rating capable of being employed on installations requiring a 1,000 mva., 13.8 kv. interrupter.

Another object of the present invention is to provide an improved magnetic air circuit interrupter which will be capable of carrying continuous currents of from 1,200 to 3,000 amperes with a momentary current rating of, say, approximately 80,000 amperes. In addition, the circuit interrupter of the present invention is capable of withstanding a four-second ampere rating of 50,000 amperes and is capable of interrupting 50,000 amperes.

Accordingly, it is a further object of the present invention to provide an improved magnetic air circuit interrupter which will accomplish arc interruption in a more effective manner, and moreover, will prevent a concentration of the ionized exhaust gases to prevent the possibility of flashover over the exhaust end of the arc chute during an interruption of heavy fault current.

Another object of the present invention is to provide an improved magnetic air circuit interrupter in which the magnetic structure is fabricated with an improved configuration to minimize weight, and yet to retain the characteristics of providing an intensive magnetic field throughout the arc-chute space.

Another object of the present invention is to provide an improved circuit interrupter in which the spaced plate portions are braced, or additionally supported, adjacent their midportions to prevent their fracture during high-current interruption.

Still a further object of the present invention is to provide an improved seal between the sides of the arc-chute stacks and the immediately adjacent arc-chute side plates to prevent the entrance of ionized gas in the cracks between the arc-chute stacks and the side plates for preventing breakdown along the side of the arc chute.

Still a further object of the present invention is to provide an improved air-break magnetic circuit-interrupting structure in which improved venting means is provided at the exhaust end of the arc chute to more effectively disseminate and disperse the ionized exhaust gases, which are ejected during a heavy-current interrupting operation.

Further objects and advantages will readily become apparent upon reading the following specification, taken in conjunction with the drawings, in which.

Figure 1:
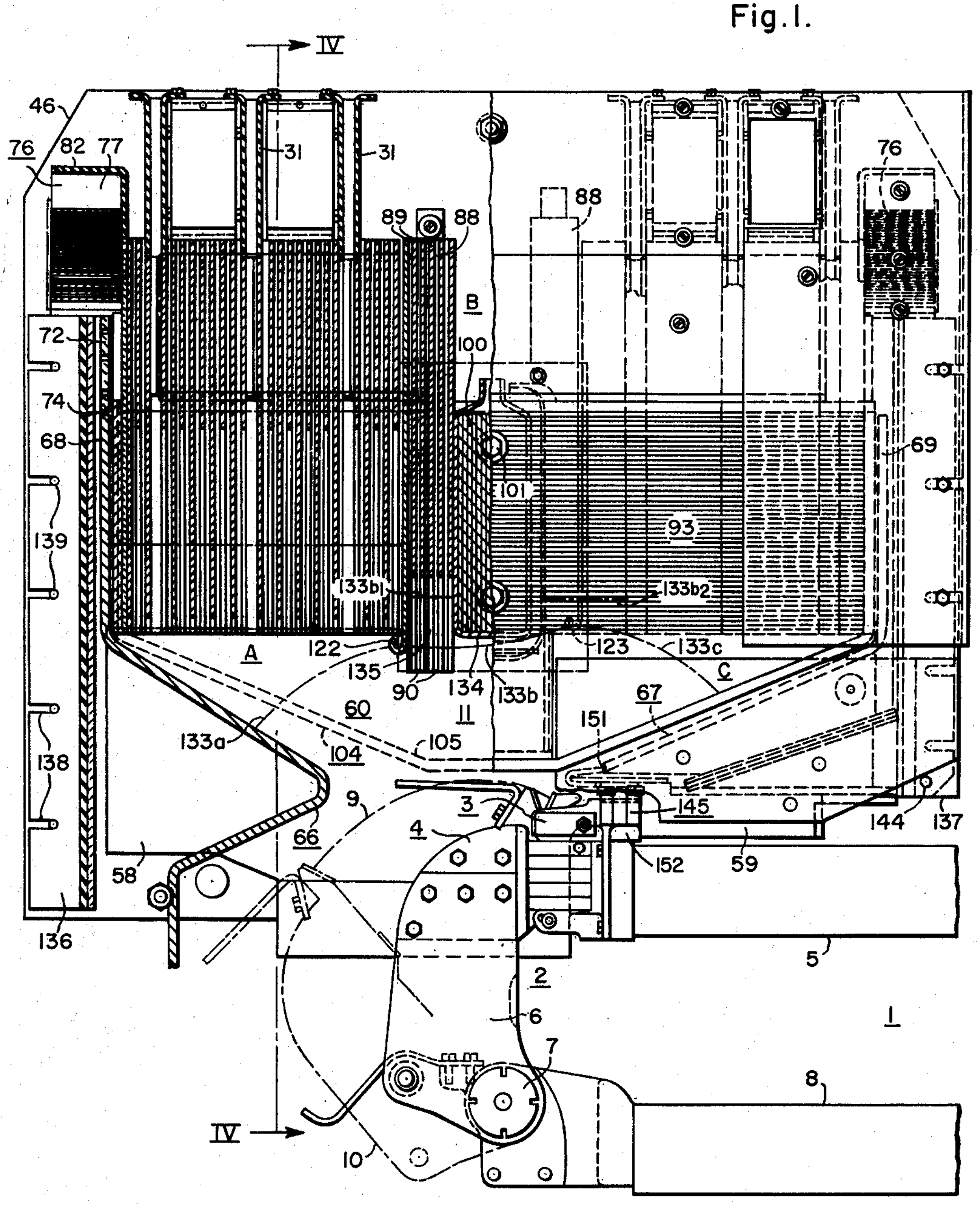
FIGURE 1 is a side elevational view, partially in vertical section, of an arc-chute assembly embodying the present invention, with the contact structure being shown in the closed-circuit position.
Figure 19:
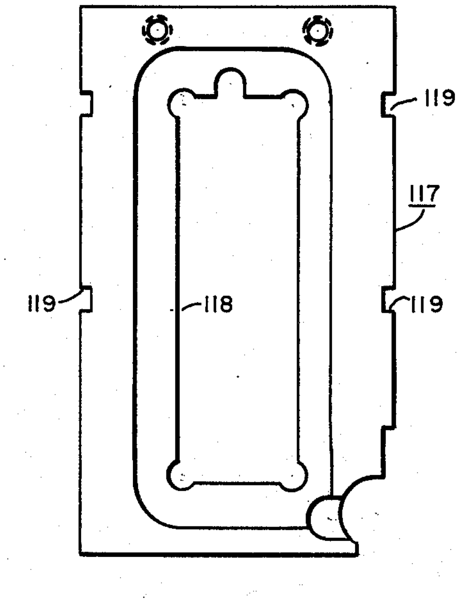
Figure 20:
Figure 21:
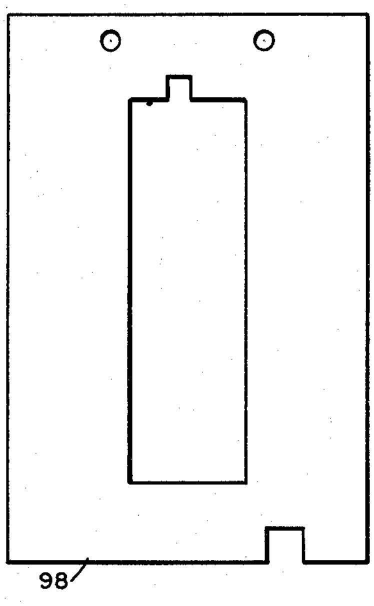
Figure 22:
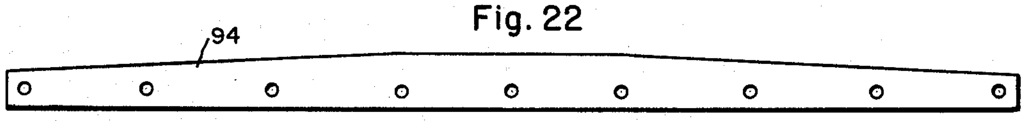
Figure 25:
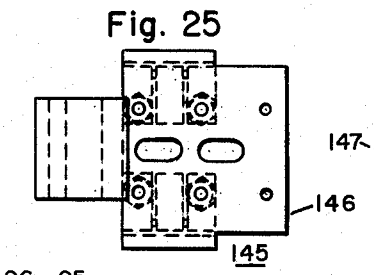
Figure 26:
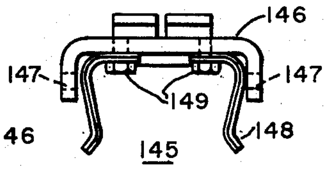
Figure 27:
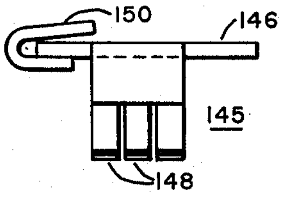
Figures 23, 24:
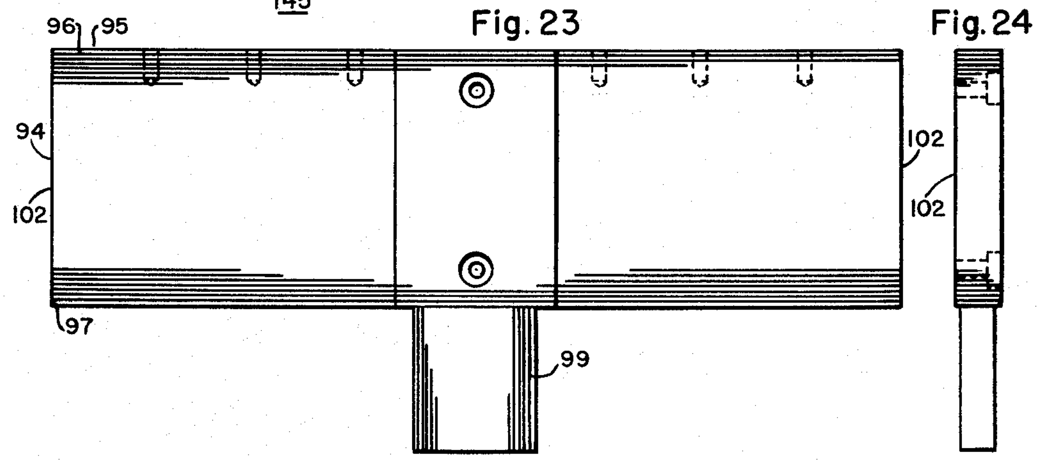
Figures 28, 29, 30, 31, 32, 33:
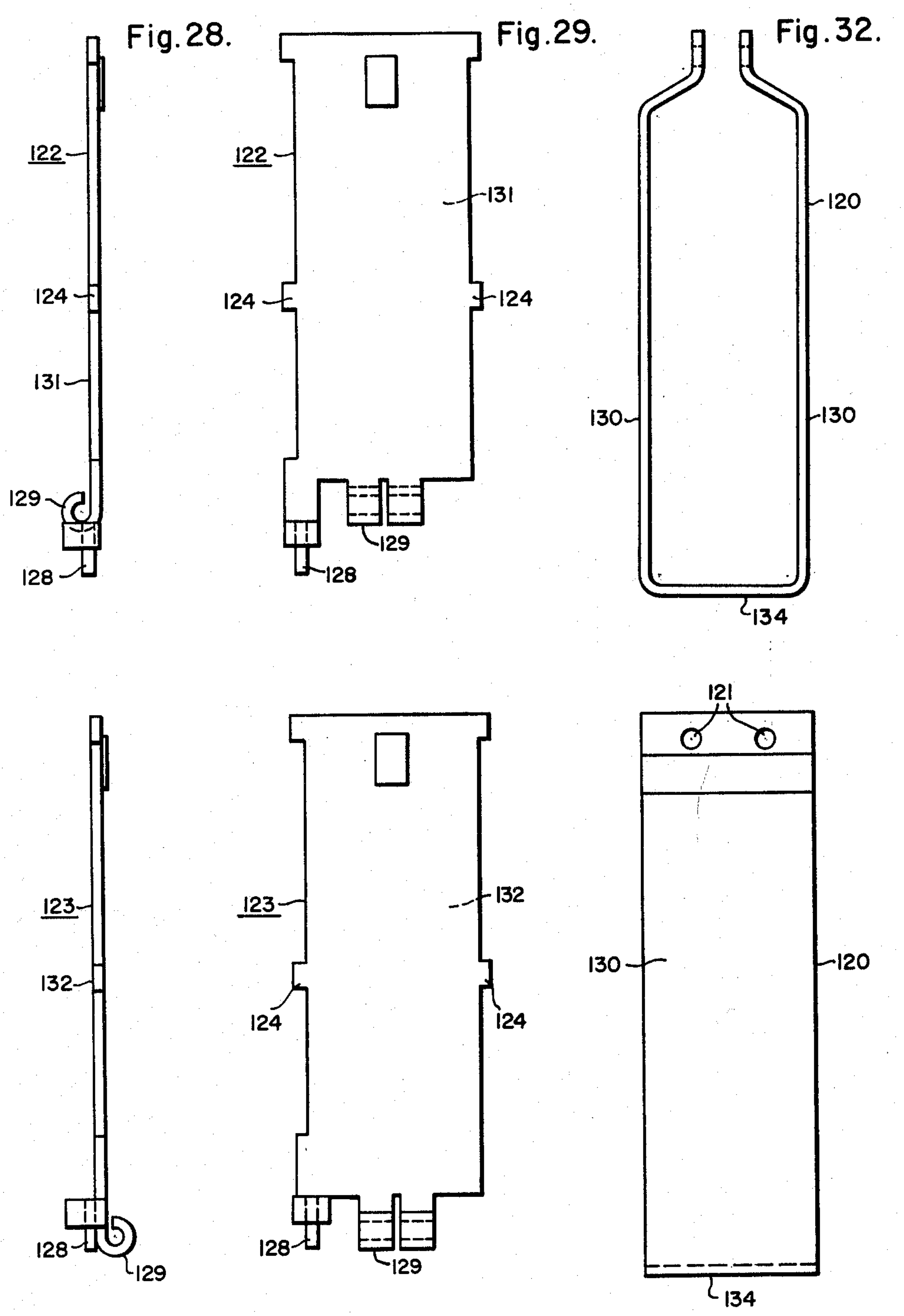

FIGS. 19 and 20, respectively, illustrate side elevational and end elevational views of one of the insulating coil washers employed in the arc-chute assembly of FIG. 1;

FIG. 21 illustrates, in side elevation, one of the coil shields employed in the arc-chute assembly of FIG. 1;

FIG. 22 illustrates a top plan view of one of the magnetic laminations employed in the side magnetic pole-plate of FIG. 23;

FIG. 23 illustrates a side elevational view of one of the magnetic side pole-plate members of the arc-chute assembly of FIG. 1;

FIG. 24 is an end elevational view of the magnetic side pole-plate member of FIG. 23;

FIGS. 25–27 illustrate respectively top plan, end elevational and side elevational views of the contact-clip assembly for the rotatable arc chute of FIG. 1;

FIGS. 28 and 29 illustrate respectively end elevational and side elevational views of one of the center-coil arc horns of the arc chute of FIG. 1;

FIGS. 30 and 31 illustrate, respectively, end elevational and side elevational views of the other center-coil arc horn of the arc-chute assembly of FIG. 1;

FIG. 32 illustrates an end elevational view of the shading coil used around the magnetic yoke of the arc-chute assembly of FIG. 1;

FIG. 33 is a side elevational view of the shading coil of FIG. 32; and

Figures 4, 34:
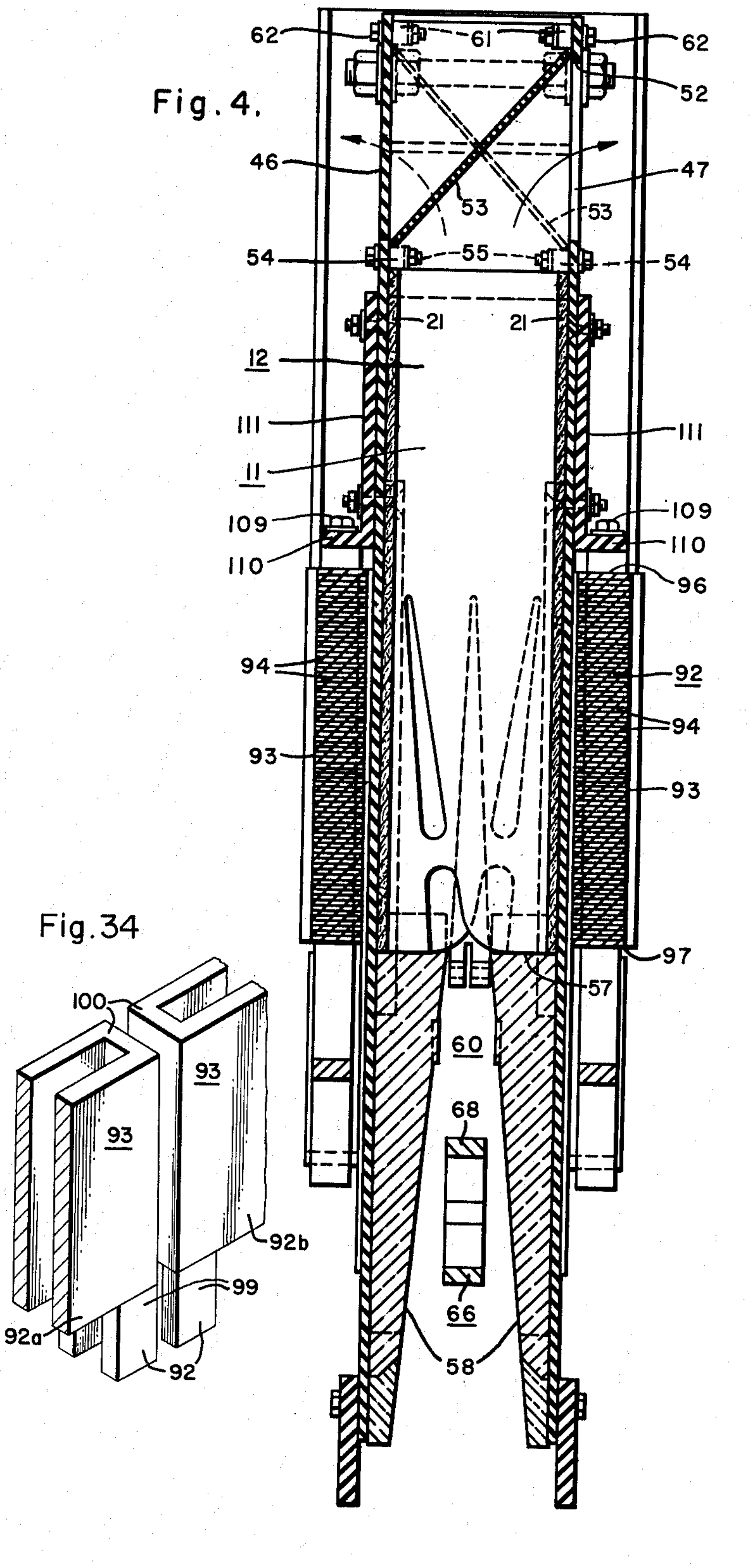
FIG. 4 is a vertical sectional view taken through the arc-chute assembly substantially along the line IV—IV of FIG. 1, with the contact structure omitted.

FIG. 34 is a fragmentary diagrammatic view of the magnetic structure.

Referring to the drawings, and more particularly to FIG. 1 thereof, the reference numeral 1 generally designates a magnetic air circuit interrupter embodying the principles of the present invention, and comprising contact structure 2, which includes a relatively stationary contact 3 and a cooperable movable contact 4. Preferably, the movable contact 4 is disposed at the outer free end of a contact arm 6, which is rotatable about a lower fixed pivot 7. As shown, the fixed pivot 7 is associated with a laterally extending terminal bushing 8, the right-hand end of which makes connection with the external electrical circuit, not shown.

Certain features of the contact structure 2 are set forth and claimed in United States patent application filed December 13, 1957, Serial No. 702,576, now United States Patent 2,993,105, issued July 18, 1961, to Russell E. Frink, entitled "Circuit Breaker," and assigned to the assignee of the instant application.

During the opening operation, the mechanism associated with the rotatable contact arm 6, is effective to cause a counterclockwise rotative motion of the contact arm 6 about its pivot 7, thereby establishing an arc 9 between the separable contacts 3 and 4. The partially open-circuit position of the movable contact 4 and switch arm 6 is indicated by the dotted position 10 of FIG. 1.

The arc 9, established between the relatively stationary contact 3 and the movable contact 4, is moved upwardly within an arc-chute structure, generally designated by the reference numeral 11.

Generally, the arc-chute assembly 11 includes three portions A, B and C. The arc-chute sections A and C are formed of unitary, cemented, spaced-plate stack portions 12, more clearly shown in FIGS. 5–7 of the drawings. Each cemented spaced-plate stack structure 12 includes a plurality of spaced, slotted, ceramic, non-gas-evolving, insulating plates 13, 14, respectively illustrated in FIGS. 8 and 9 of the drawings.

Figure 8:
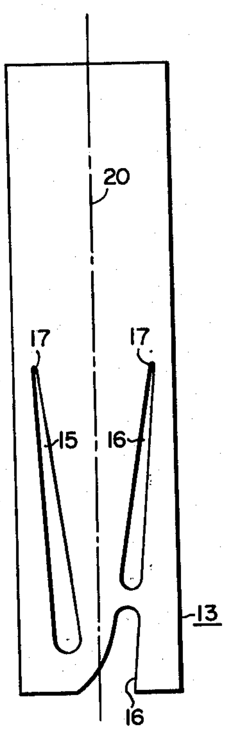
FIGS. 8 and 9 illustrate side elevational views of the two types of plates utilized alternately through the main cemented interrupting plate stack structure of FIGS. 5–7.

With reference to FIG. 8 of the drawings, it will be noted that the ceramic plate 13 has provided therein a pair of diverging, generally upwardly extending slots 15, 16, the upper ends 17 of which are closed, as shown.

Figure 9:
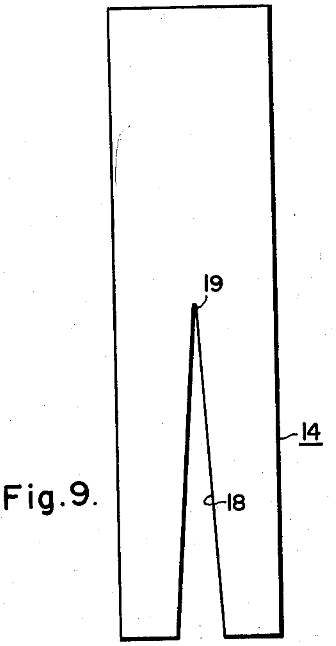

The slotted ceramic insulating plate 14, illustrated in FIG. 9, on the other hand, has only a single centrally-disposed converging slot 18 provided therein. The upper end 19 of the centrally-disposed slot 18 is closed, as shown in FIG. 9.

Figure 6:
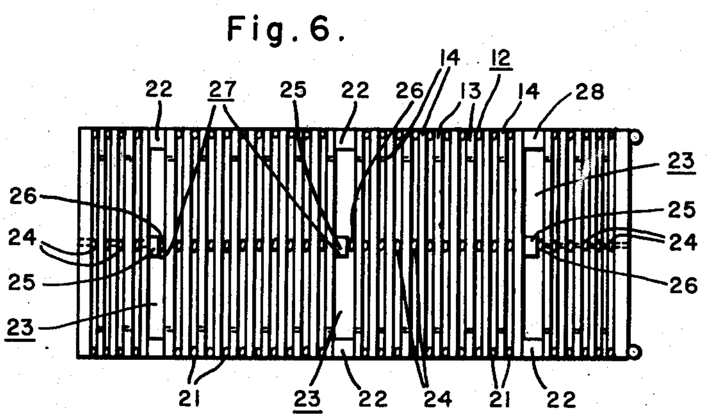
FIG. 6 is a fragmentary, top plan view of the main, cemented, interrupting stack structure of FIG. 5.
Figure 5:
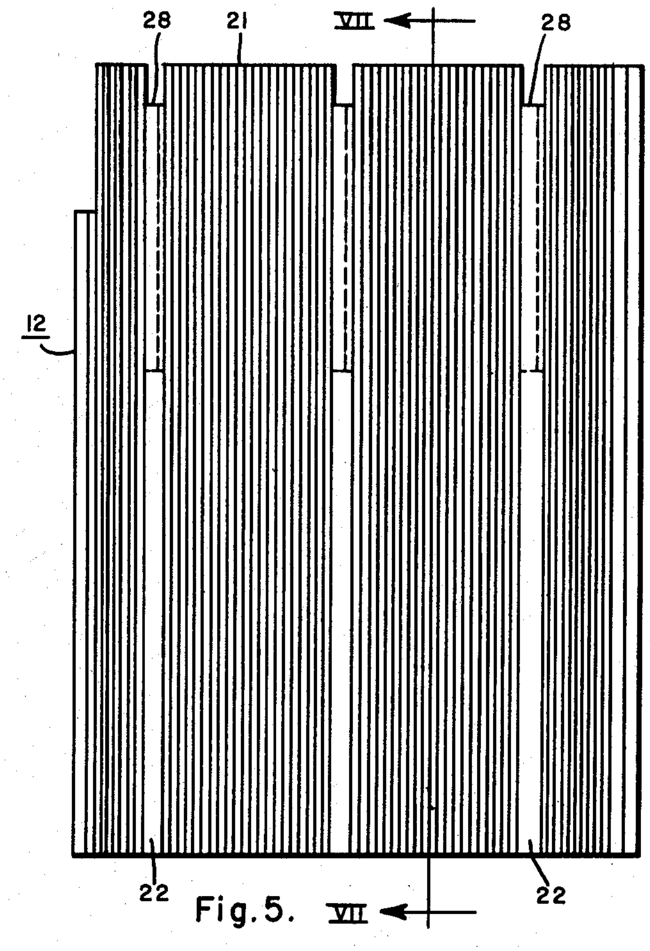
FIG. 5 illustrates a side elevational view of one of the cemented, main, spaced-plate stack structures.

During the assembly of the arc-chute stack 12 of FIGS. 5 and 6, the plates 13 and 14 are alternated within the stack. During the assembly operation, the double-slotted insulating plates 13 are positioned in such manner that the open-ended slot 16 is placed so that the upper end of the slot 16 is disposed to the right of the center-line 20 of the plate 13, whereas the next insulating plate 13, which is placed within the assembly 12, is arranged so that its open-ended slot 16 is positioned to the other side of the center line 20 of the plate. As a result, an alternated plate construction results, as more clearly illustrated, in the sectional view of FIG. 4.

Sections of asbestos rope 21 are employed to space the plates 13 and 14 a relatively small distance apart. The sections of asbestos rope 21 are disposed along the outer side edges of the plates 13, 14 in the manner illustrated in FIG. 6 of the drawings, and are cemented to the side edges of the plates 13, 14. Following the assemblage of the ceramic plates 13, 14, the stack structure 12 is baked, so as to constitute a unitary assemblage, which may be bodily inserted within the arc-chute structure 11.

As set forth in the aforesaid Kozlovic et al. Patent 2,889,433, it has been discovered that an unusual, marked increase of interrupting ability is obtained for the spaced-plate stack structure 12 by utilizing, at several spaced portions along the stack structure 12, relatively wide, insulating spacing strips 22, as more clearly illustrated in FIG. 5, which are substituted for the asbestos-rope sections 21 at these locations. In practice, these insulating, relatively-wide, spacing strips 22 may be almost four times as wide as the width of the asbestos-rope section 21, and thereby provide a plurality of enlarged chimney passages 23, spaced along the stack structure 12 in the manner more clearly illustrated in FIG. 6 of the drawings.

It has been discovered that the use of many such enlarged chimney passages 23 results in very rapid movement of the arc upwardly within the stack structure 12, and, in addition, permits the ready venting of ionized gases upwardly out of the arc-chute structure 11, with the result that greatly improved interrupting performance of the circuit interrupter 1, as a whole, is obtained.

As mentioned, the main interrupting stacks 12 are built up from ceramic plates 13, 14, with alternate single and double slots, having asbestos-rope sections 21 disposed therebetween at the outer side edges thereof. This particular plate construction is set forth and claimed in United States Patent 2,871,318, issued January 27, 1959, to Russell E. Frink, and assigned to the assignee of the instant application.

The plates 13, 14 are of necessity wide, and the gas pressure is sufficient, when interrupting maximum fault currents to occasionally effect breakage of the plates. To overcome this problem, a construction has been adopted, as more clearly shown in FIGS. 5–7 of the drawings. Lengths of asbestos rope 24, saturated with urea-formaldehyde cement, are placed between the plates 13, 14, midway between their edges. These asbestos-rope sections 24 extend from approximately 1½ inches above the closed ends 19 at the upper ends of the slots 18 to the upper ends of the plates 13, 14. This construction is more readily apparent from a study of FIG. 10 of the drawings.

Figure 7:
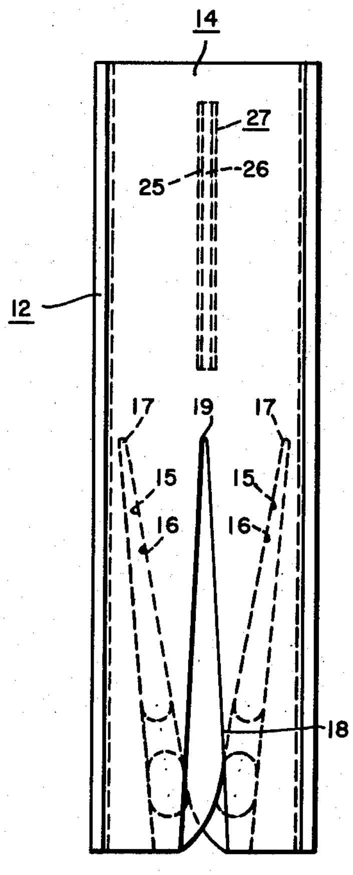
FIG. 7 is an end elevational view of the spaced-plate stack structure of FIG. 5.

Blocks of asbestos lumber 25 are cemented in a similar location within the chimney passages 23, as more clearly shown in FIG. 6 of the drawing. In conjunction with the use of the asbestos-lumber spacing blocks 25, additional asbestos-rope sections 26 are employed, as shown in FIGS. 6 and 7, being aligned along one side surface of the bracing strip 25 for additional support.

The aforesaid bracing construction, generally designated by the reference numeral 27, gives additional support to the plates 13, 14, and breakage of the plates, caused by the gas pressure at high-current interruption was completely eliminated.

Figure 10:
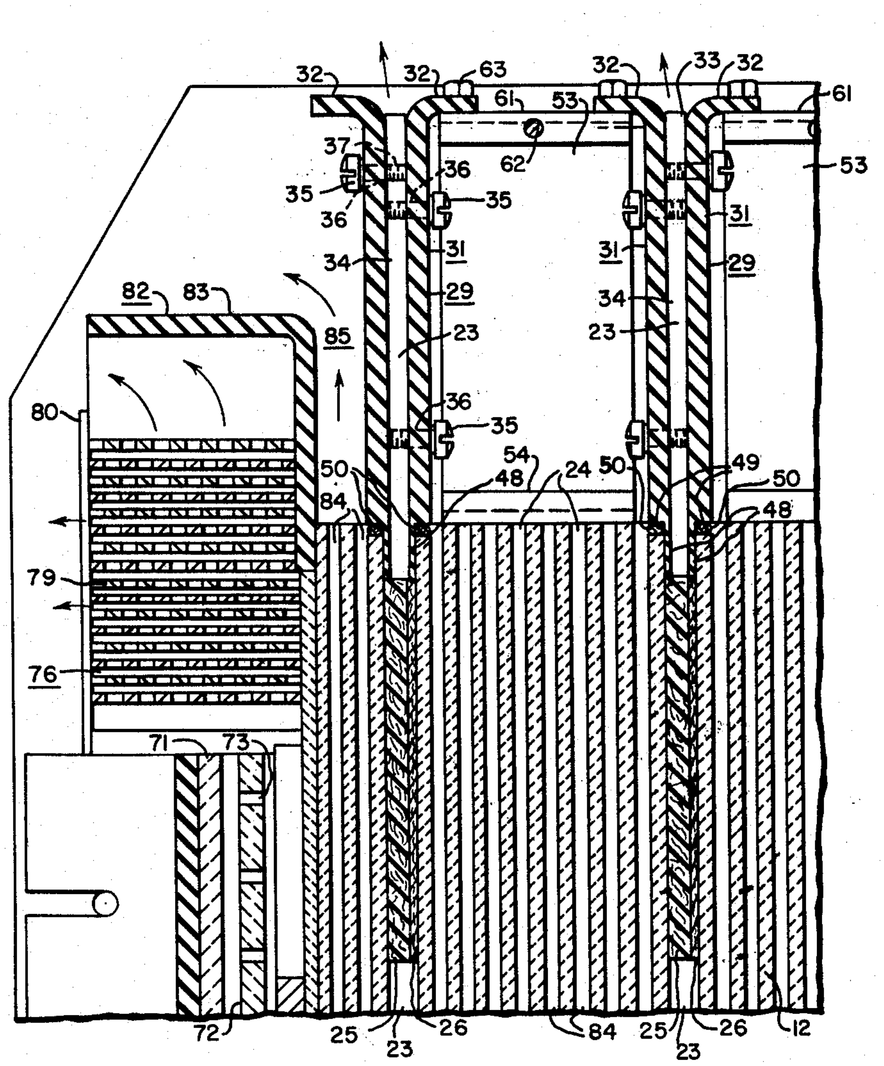
FIG. 10 is an enlarged, fragmentary, vertical sectional view taken through an upper corner portion of the arc-chute assembly, showing more clearly the cooling baffle structure and the deflecting means for dispersing the exhaust gases.

It will be noted that the spacing strips 22 have their upper ends shortened, as at 28 in FIG. 5, to accommodate chimney-extension structures, generally designated by the reference numeral 29, and more clearly shown in FIG. 10 of the drawings. Each chimney-extension structure 29 extends the enlarged chimney passages, or enlarged vent passages 23, approximately six inches above the top of the main stack structure 12, as shown in FIG. 10.

Figure 3:
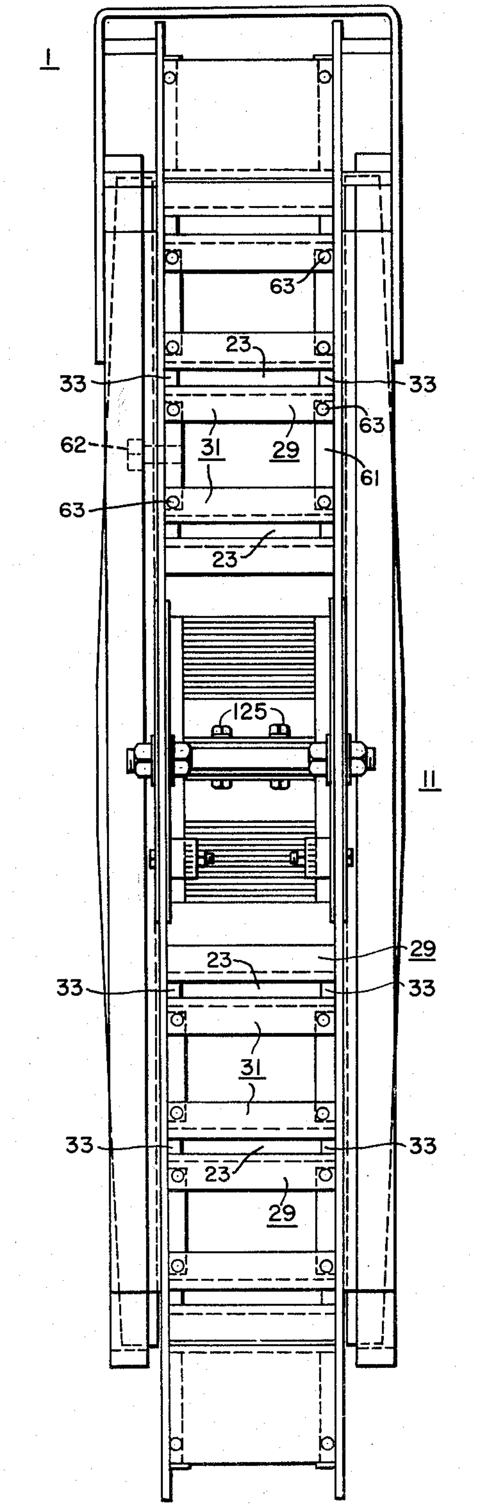
FIG. 3 is a top plan view of the arc-chute assembly of FIG. 1.

Each chimney-extension structure 29 includes a pair of insulating deflecting angles 31, as more clearly shown in FIG. 10 of the drawings. As illustrated in FIG. 10, two such deflecting angles 31 are faced in opposite directions, that is, having horizontally deflecting portions 32 directed oppositely, and between the two deflecting angles 31 is positioned a pair of insulating spacing strips 33 more clearly shown in FIGS. 3 and 10 of the drawings.

Bolts 35 extend through holes 36 provided in the deflecting angles 31, and are threadedly secured into tapped holes 37 in the spacing strips 33.

As set forth in the aforesaid Patent 2,889,433, it has been found to be very important to obtain a gas-tight seal between the chimney extension 29 and the upper end of the main spaced plate stack structure 12. Unless such a gas-tight seal is obtained, there is a possibility of exhaust gas leakage, which will be partly ionized, and flashover across the outer end of the stack structures 12 may result.

Each deflecting angle 31 has its lower end machined to a thin strip 48, as shown more clearly in FIG. 10, and then the surface of the thin strip 48 is covered with cement, and cemented to the upper ends of adjacent plates 13, 14 in the manner shown in FIG. 10. Considerably improved results were thereby obtained. In addition to the cement between the outer faces of the thin strips 48 and the upper side surfaces of the plates 13, 14, there is also cemented along the shoulder portion 49 of the deflecting angle 31 an asbestos-rope section 50, again more clearly shown in FIG. 10. This asbestos-rope section 50 is secured by cement not only to the shoulder portion 49 of the deflecting angle 31, but also to the upper extremity of the insulating plates 13, 14, as shown.

As a result of the above construction, a firm gas-tight seal is obtained between the chimney extension structure 29 and the outer end of the widened exhaust passage 23. The chimney extension 29, which may be approximately six inches above the chute stack 12, for example, renders the widened exhaust passages 23 more effective, increasing the flue effect and, in addition, the deflecting angles 31 ensure a deconcentration of the ionized exhaust gases. This assists in preventing flashover across the outer end of the arc chute 11.

Figure 16:
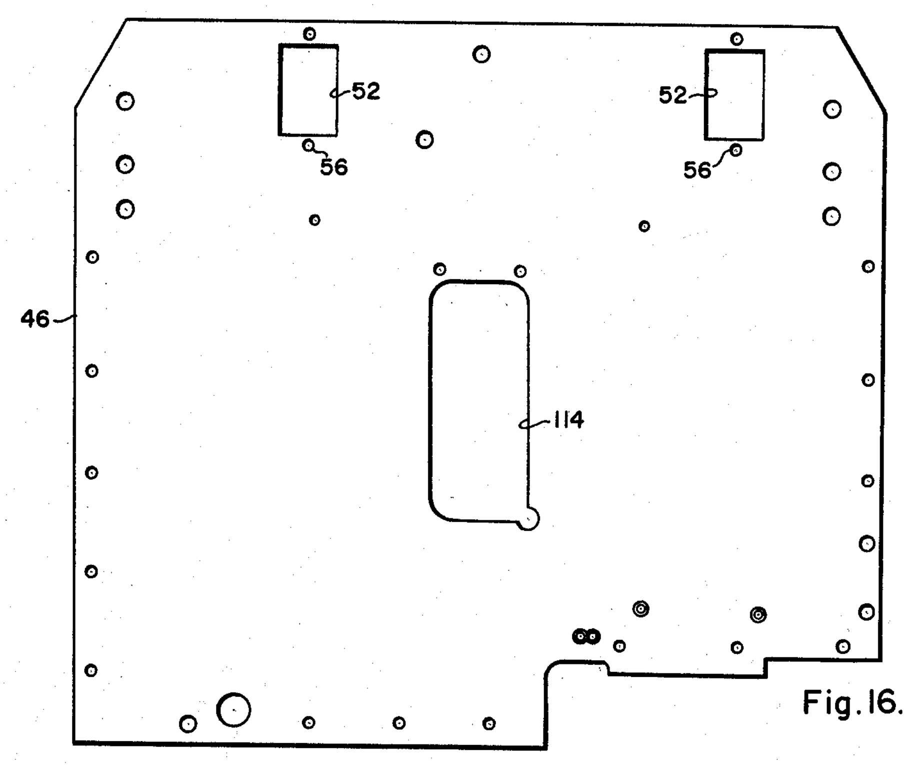
FIG. 16 is a considerably reduced view of one of the side interrupting support plates, utilized in the assembly of the arc chute of FIG. 1.

To further assist in effecting a deconcentration of the ionized exhaust gases emanating from the upper end of the arc chute 11, the side insulating interrupting plates 46, 47 have provided therein lateral vent openings 52, as more clearly shown in FIGS. 4 and 16 of the drawings. The vent openings 52 are staggered in the side housing plates 46, 47 so that, as shown in FIG. 1, lateral venting will take place in alternate directions throughout the length of the arc-chute assembly, as shown in FIG. 4.

Cooperating with the lateral vent openings 52 are diagonally positioned deflecting plates 53 composed of a suitable insulating material. FIG. 4 more clearly shows the diagonal positioning of the deflecting plates 53 which, together with the staggered vent openings 52, provide lateral exhausting of the arc gases first from one side of the housing plate 46, then from the other side of the housing plate 47 and in a similar fashion throughout the length of the arc-chute assembly.

With reference to FIGS. 4 and 10 of the drawings, it will be noted that a horizontally positioned lower support strip 54 is bolted by fastening means 55, such as a nut and bolt, to the side support plate 46 through an aperture 56 provided therethrough. FIG. 16 may be referred to in this connection. Also, the supporting strip 54 assists in maintaining the arc-chute stacks 12 firmly into position, the lower side 57 of the arc chute stack 12 resting upon the upper sides of lower ceramic arc shields 58, 59 extending in abutting fashion along each lower side of the housing plates 46, 47. As shown, the arcing shields 58, 59 preferably formed from a ceramic material, such as porcelain, provide a gradually tapered V-shaped entrance passage 60 extending upwardly into the arc chute structure 11.

With further reference to FIGS. 4 and 10, it will be noted that upper horizontally extending supporting strips 61 are employed, secured by fastening means 62 to the side housing plates 46, 47, which additionally assist in maintaining the deflecting plates 53 into a proper position. Moreover, as more clearly illustrated in FIG. 10 of the drawings, the supporting strips 61 are bolted, as at 63 to the lower side surfaces of the horizontal portion 32 of the deflecting angle 31. In this manner, it is apparent that a rigid supporting of the chimney-extension structure 29 is obtained.

There is provided a pair of arc-horn assemblies 66, 67 associated, respectively, with the front arc horns 68 and with the rear arc horns 69. As more clearly illustrated in FIG. 2 of the drawings, the front arc horn 68 is slotted, having a slot 70 therein, and is secured in spaced relation by means not shown to an upstanding ceramic channel-shaped support member 71, a portion of which is shown in FIG. 10. Disposed above each arc horn 68, 69 is a perforated asbestos splitter plate 72 having holes 73 therein, immediately above the upper end 74 of the arcing horns 68, 69. The functioning of the perforated asbestos splitter plates 72 is described and claimed in United States Patent No. 2,442,199, issued May 25, 1948, to Robert C. Dickinson and Russell E. Frink, and assigned to the assignee of the instant application.

Figure 2:
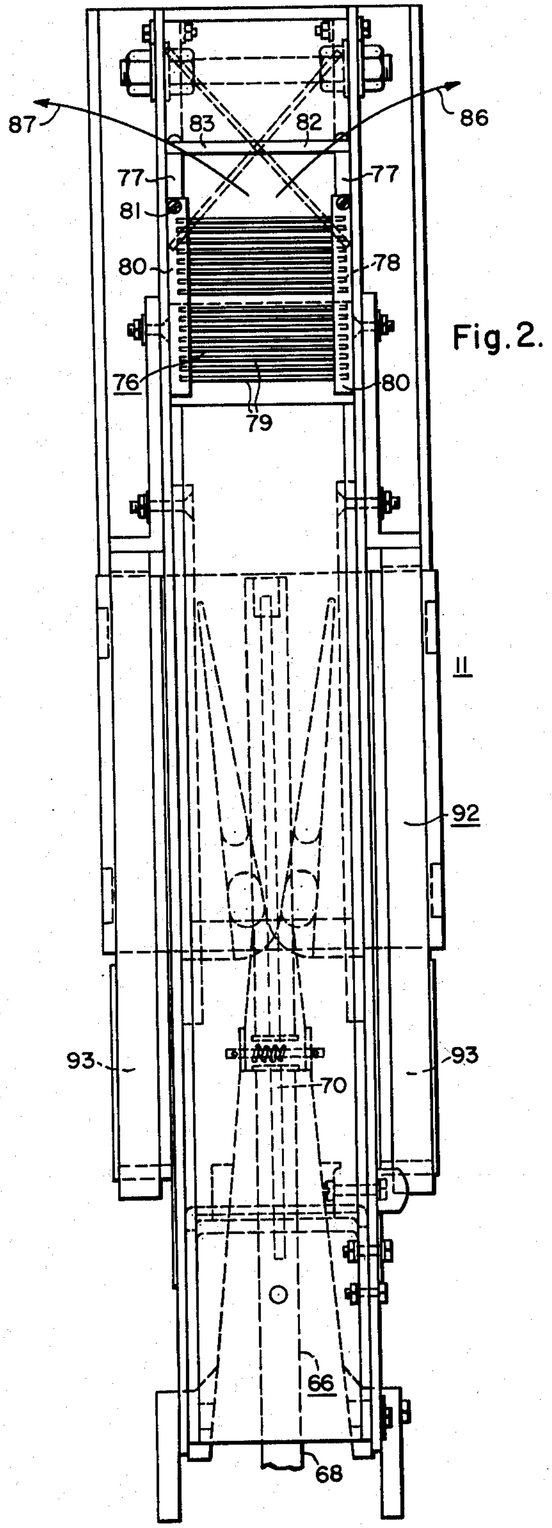
FIG. 2 is an enlarged, end elevational view, looking toward the front of the arc-chute assembly of FIG. 1 with the contact structure omitted.

It has been found that during the interruption of heavy fault currents, when the amount of ionized gas is considerable, that flashover externally of the exhaust end of the arc chute 11 is a distinct possibility; and to avoid this, there is associated with each arc-horn assembly 66, 67 a cooling baffle assembly, generally designated by the reference numeral 76. Each cooling baffle assembly 76 is constructed from a pair of grooved, side insulating support plates 77, more clearly shown in FIG. 2 of the drawings. With reference to FIG. 2, it will be noted that a plurality of spaced grooves 78 are provided in the support plates 77, which serve to support, and to retain, a plurality, in this particular instance sixteen, perforated mesh brass screens 79. The screens 79 are of generally rectangular configuration. During the assembly process the several mesh screens 79 are positioned within the grooves 78 of the support plates 77, and are retained therein by additional holding strips 80 (FIG. 2), which are secured by bolts 81 threaded into the sides of the grooved support plates 77. These support plates 77 are, in turn, secured by bolts to the side housing plates 46, 47.

The cooling baffle assembly 76 not only comprises the aforementioned several mesh screens 79, but also includes an insulating deflecting angle 82, more clearly shown in FIG. 10 of the drawings, which is cemented, in a manner as previously described, to the upper end of the main stack portion 12. Thus, any exhaust gases which are ionized, and which might be conducive to electrical flashover across the arc chute 11, or between adjacent phases, will be cooled upon passage through the stacked mesh screens 79, and will be deflected outwardly, substantially at right angles to the exhaust direction, by the horizontally extending portions 83 of the insulating deflecting angles 82.

There is provided a cooling baffle assembly 76 at the upper end of each arcing-horn assembly 66, 67 so that at the ends of the arc-chute assemby 11 the exhaust gases are directed outwardly in substantially opposite directions.

From the foregoing description, it will be apparent that the exhaust gases during interruption will be deflected outwardly in opposite directions by the deflecting angles 82 disposed at opposite ends of the arc-chute assembly 11. In addition, with reference to FIG. 10, it will be observed that the arc gases passing upwardly between the relatively narrow venting passages 84, between the plates 13, 14 will pass between the deflecting angles 82, 31 within the passage 85 of FIG. 10.

The gases passing upwardly through the enlarged venting passages 23 will, of course, be cooled and will be directed upwardly through the upper ends of the chimney extension structures 29.

With further reference to FIG. 10, it will be noted that because of the provision of the deflecting plates and the vent openings provided in the housing side plates 46, 47 that the exhaust gases passing upwardly within the relatively narrow passages 84 between adjacent chimney extension structures 29 will be directed laterally out of opposite ends of the arc chute assembly 11, in a manner indicated by the arrows 86, 87 of FIG. 2.

With reference to FIG. 1 of the drawings, it will be noted that the diffused venting at the right-hand end of the arc chute assembly 11 is similar to that previously described with reference to the left-hand end of the arc-chute assembly 11.

The central portion B of the arc-chute assembly 11 includes a pair of spaced-plate transfer stacks 88, more fully shown in FIG. 1 of the drawings. Each of the transfer stacks 88 is assembled from a plurality of non-gas-evolving, ceramic plates 89, each of which has an offset slot, open at the lower end of the plate and closed at the upper end of the plate, such slots being offset from the center lines of the plates 89. Again asbestos-rope sections 90 are employed to space the plates 89 a relatively small distance apart, and the upper closed ends of the slots in such plates 89 are again staggered during the assembly operation about the center-lines of the plates 89. The asbestos-rope sections 90 are cemented to the side edges of the plates 89, so that again a cemented unitary stack structure 88 results.

The magnetic structure 92 for the arc-chute assembly 11 is of generally H-shape, as illustrated in the aforesaid Patent 2,889,433. With reference to FIG. 1, it will be noted that a pair of side magnetic pole-plates 93 are utilized, each of which is assembled from a plurality of magnetic strips 94 having a configuration more clearly shown in FIG. 22 of the drawings. The magnetic strips 94 are riveted together, as by rivets 95 having insulating tubes thereabout, not shown. Upper and lower magnetic reinforcing strips 96, 97 are employed having a slightly greater width than the intermediate laminations 94. A depending pole-plate portion 99, illustrated in FIG. 23, is secured, as by welding, to the pole plates 93. The function of the depending pole plate portion 99 is set forth and claimed in United States Patent 2,616,007, issued October 28, 1952, to Russell E. Frink and Robert C. Dickinson, and assigned to the assignee of the instant application.

Interconnecting the pole plates 93 is an interconnecting yoke portion 100 (FIG. 1), which may be bolted to the side magnetic pole plates 93 by mounting bolts 101, as shown in FIG. 1.

The magnetic flux density in the pole-pieces 93 decreases toward the outside ends 102, and, therefore, the side magnetic pole-plates 93 are tapered, as can be seen from the top view of the individual laminations 94, as illustrated more clearly in FIG. 22 of the drawings. This results in a decrease in weight of the magnetic structure 92 with no loss in efficiency. As diagrammatically indicated in FIG. 34, the magnet structure 92 may be considered as comprising a pair of oppositely extending U-shaped magnet portions *92a*, *92b*.

Figure 17:
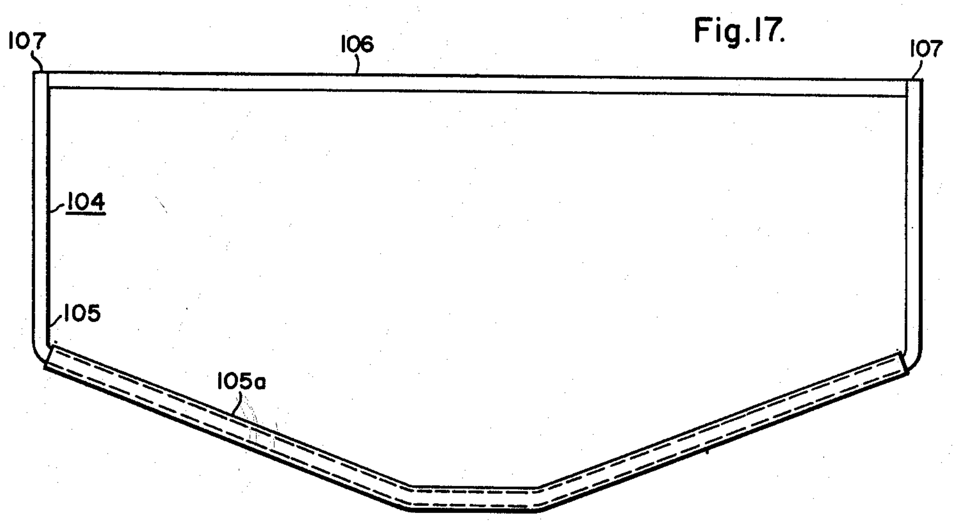
FIG. 17 is a side elevational view of the leakage suppressor, which surrounds the side magnetic pole plate, illustrating the lower insulating cover therefor.
Figure 18:
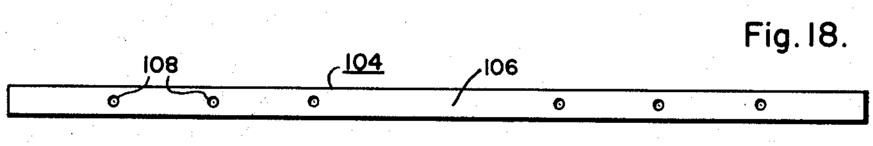
FIG. 18 illustrates, in plan, the top connecting strap portion of the magnetic leakage suppressor of FIG. 17.

The side magnetic pole-plates 93 are surrounded by a leakage suppressor, generally designated by the reference numeral 104 and more clearly shown in FIGS. 17 and 18 of the drawings. For the particular rating of the circuit interrupter being described, that is, 1,000 mva. at 13.8 kv., the leakage suppressor 104 is fabricated from copper strip one inch wide and one-half inch thick.

As shown in FIG. 17, the leakage suppressor 104 comprises a lower substantially U-shaped yoke portion 105, which has an insulating tube *105a* of heat-shrinkable vinyl material disposed thereon and, as a subsequent assembly operation, the upper connecting strap portion 106 is brazed into position between the outer ends 107 of the yoke 105. The connecting strap 106 is apertured, as at 108, in FIG. 18 and accommodates mounting bolts 109, which extend downwardly into tapped openings provided in the upper sides of the side magnetic pole-plates 93. The mounting bolts 109 also pass through horizontally extending portions 110 of insulating support brackets 111 in a manner more clearly shown in FIG. 4 of the drawing.

The theory and operation of the magnetic leakage suppressor 104 is fully set forth and claimed in U.S. Patent 2,697,154, issued December 14, 1954, to Albert P. Strom, and assigned to the assignee of the instant application.

Figures 14, 15:
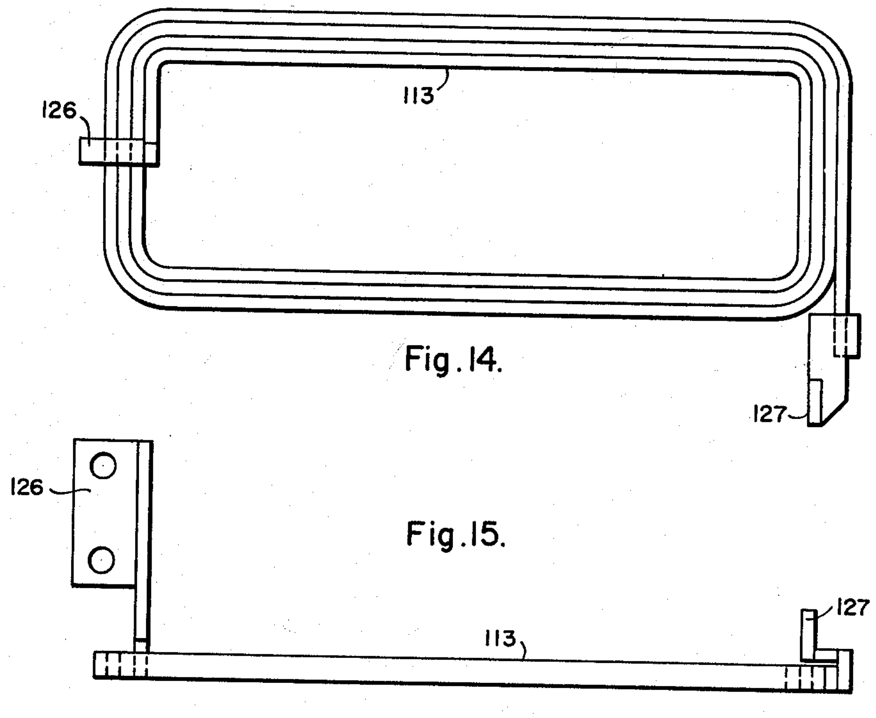
FIGS. 14 and 15 are, respectively, top plan and side elevational views of the pancake-shaped center coils used in the arc-chute assembly of FIG. 1.

In the assembly of the arc-chute assembly 11, first one takes a side magnetic pole-plate 93 and the yoke, or core 100, which is bolted thereto by the mounting bolts 101. A coil washer 98 (FIG. 21) is placed over the yoke 100. One of the side housing insulating plates 46, shown in FIG. 16, is then placed over the core 100. A pancake-shaped center coil 113, more clearly shown in FIGS. 14 and 15, is then placed over the core 100, and inside of the substantially rectangularly-shaped opening 114 in the insulating side plate 46 (FIG. 16), so as to be braced by the periphery of the hole 114. This particular feature is set out and claimed in U.S. Patent No. 2,769,065, issued October 30, 1956, to Russell E. Frink, and assigned to the assignee of the instant application.

Following the assembly of the center coil 113, an insulating coil washer 117, illustrated in FIGS. 19 and 20, is assembled over the core 100, with the core protruding through a rectangularly-shaped opening 118 in the coil washer 117. The insulating coil washer 117 has a plurality of notches 119 provided along the side edges thereof for a purpose to be explained hereinafter.

The yoke 100 has previously been wrapped with a rectangular strip of heavy paper, and a shading coil 120, illustrated in FIGS. 32 and 33, is slipped over the core 100 and the aforementioned paper wrapping, not shown. As illustrated in FIG. 33 of the drawings, the shading coil 120 has a pair of mounting holes 121 disposed at its upper end for purposes described hereinafter. A pair of center arc horns 122, 123, illustrated in detail in FIGS. 28–31, and having lugs 124, are then assembled with the aforementioned coil washer 117 and a second coil washer 117, so that the lugs 124, integrally formed with the center arc horns 122, 123, will fit into the notches 119 of the insulating coil washers 117, to form a generally box-shaped arrangement, with the core 100 passing centrally through the box. A pair of terminal bolts 125 (FIG. 3) pass through the two mounting holes 121 of the shading coil 120 (FIG. 33), and bolt the upper terminals 126 (FIG. 15) of the two pancake-shaped center coils 113 fixedly into place. The other terminals 127 (FIG. 15) of the two pancake-shaped center coils 113 are secured by nuts, not shown, to threaded studs 128 brazed to the lower curved ends 129 of the center arc horns 122, 123. Thus, there exists a circuit between the two center arc horns 122, 123 through the two center coils 113, disposed in electrical series by the mounting bolts 125. Reference may be had to U.S. Patent 2,795,675, issued June 11, 1957, to Russell E. Frink, for general features of the pancake, center coil construction, together with a shading coil and transfer-stack arrangement.

Between each outer side 130 (FIG. 32) of the shading coil 120 and the rear sides 131, 132 of the center arc horns 122, 123, respectively, are positioned the pair of unitary cemented transfer stacks 88, previously described. Thus, the initially established arc 9, moving upwardly because of the loop circuit including the upper and lower terminal bushings 5, 8, and the rotatable moving contact arm 6, contacts the two center arc horns 122, 123 at the lower curved portions 129 thereof. The initially established arc 9 may now be considered to be divided into three portions, namely arc portion 133*a*, extending between the front arc horn 68 and the front center arc horn 122, an intermediate arc portion 133*b* extending between the lower ends 129 of the two center arc horns 122, 123, and a third arc portion 133*c* extending between the rear center arc horn 123 and the rear arc horn 69 of the arc-chute assembly 11, as indicated in FIG. 1 of the drawings.

The intermediate arc portion 133*b* moves upwardly against the lower surface 134 (FIG. 32) of the shading coil 120, and since the shading coil 120 is of conducting material, such as bronze, the intermediate arc portion 133*b* will be broken into two sections $133b_1$ and $133b_2$. Each arc portions $133b_1$, $133b_2$ will move upwardly within the slots 135 of the plates 89, constituting the transfer stacks 88, with the ends of the arc portions $133b_1$, $133b_2$ terminating at the back surfaces 131, 132, respectively, of the center arc horns 122, 123. These arc portions $133b_1$, $133b_2$ move upwardly along the outer sides 130 of the shading coil 120, as shown more clearly in FIG. 1. Reference may be had again to the aforesaid Patent 2,795,675 in this connection.

The arc portions $133b_1$ and $133b_2$ will be quickly extinguished because of the cooling effect of the slotted transfer plates 89, and this will cause the insertion into series circuit of the two serially-related center magnetizing coils 113. The energization of the two magnetizing coils 113 generates flux within the magnet structure 92, and will result in a transverse magnetic field existing between the pole plates 93 across the main spaced-plate stack portions 12.

This transverse magnetic field will force the arc portions 133*a*, 133*c* upwardly within the slots 15, 16 of plates 13 and slots 18 of plates 14, and will bring about the extinction of the arc portions 133*a*, 133*c* in a manner described more in detail in the aforesaid United States Patent 2,871,318, issued January 27, 1959, to Russell E. Frink. United States Patent 2,632,075, issued March 17, 1953, to Herbert L. Rawlins, Robert C. Dickinson and Russell E. Frink is also pertinent in this connection.

Generally, each of the arc portions 133*a*, 133*c* moves upwardly within the open ended slots 16, 18 and, due to the offset arrangement of the slots 15, 16 in the non-gas-evolving plates 13 causes the arc portion within the plates 13 to be divided into two parallel arc portions at the plates 13 coalescing into a single arc portion within the single slot 18 of the immediately adjacent plates 14. By the subdivision of serially related portions of the arc column into two parallel arc portions at spaced lengths along the axial length of the arc column, very highly effective cooling and deionizing conditions are brought into play, which rapidly effect arc extinction as set forth in the aforesaid Frink Patent 2,871,318.

Assisting in the deionization process within the main spaced-plate stacked structures 12 is the intensive cooling action induced by the upward flow of arc gases through the relatively narrow venting passages 84 and the widened chimney passages 23. Disposition of the cooling baffle structure 76 disposed at opposite ends of the arc chute assembly 11, together with the spaced chimney extension structures 29, augmented by the lateral venting through the side window openings 52 of the side housing plates 46, 47, all contribute to an exceedingly fast interruption of the controlled circuit.

With reference to FIG. 1 of the drawings, it will be noted that the spaced arc-chute housing side wall members 46, 47 are spaced laterally apart a proper distance by insulating channel members 136, 137. These channel members 136, 137 have side slots 138 formed through the angle portions thereof, which accommodate mounting bolts 139, which extend externally of the side plates 46, 47.

Figure 13:
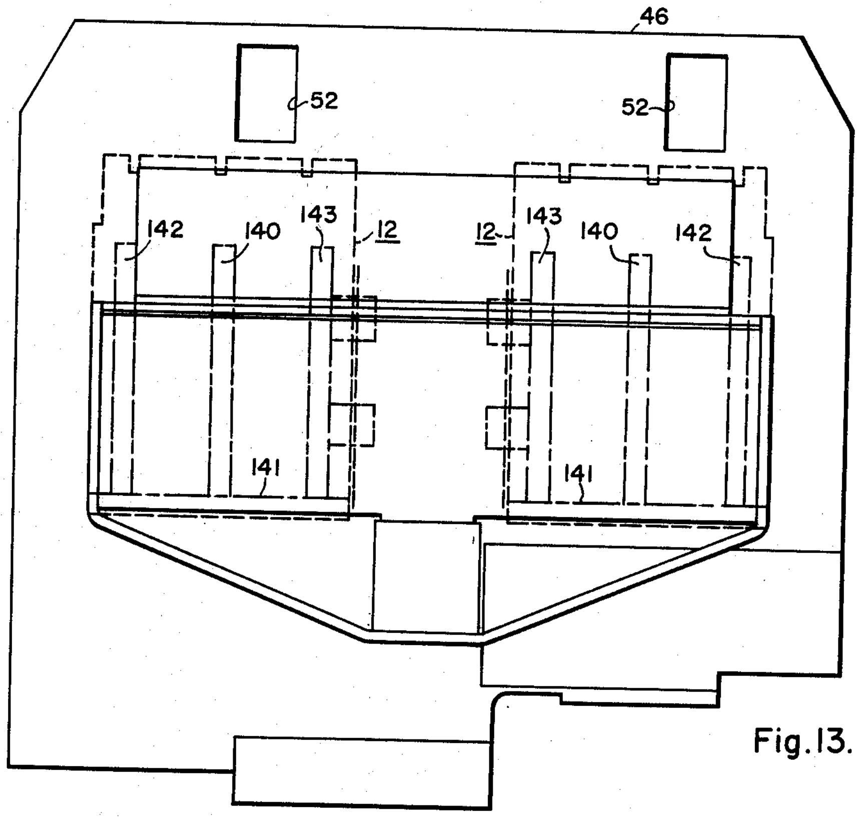
FIG. 13 illustrates the manner of providing a cemented seal between the external sides of the main arc-chute stacks and the immediately adjacent interrupter housing side plates.

As mentioned previously, the spaced-plate main arc-chute stacks 12 are supported upon the upper surfaces of the arcing plates 58, 59, as more clearly shown in FIG. 4, and it has been found that at the currents and voltages encountered with the rating of the arc-chute assembly presently described, that gas in the crack between the main stacks 12 and the housing side sheets 46, 47 was at times sufficiently ionized that a breakdown of explosive violence would occur. To correct this difficulty, a mixture of epoxy resin with a suitable filler, such as quartz, was made and applied, as indicated in FIG. 13 of the drawings.

Prior to the installation of the spaced plate interrupting stacks 12 into position upon the lowermost side sheet 46, during the assembly operation, the inside surface of the side sheet 46 is coated lightly with mold release over the area where it will come in contact with the main arc-chute stacks 12. A relatively thin strip of epoxy resin with the aforementioned filler, such as quartz, is applied approximately one inch wide and one inch thick to the surface of the side sheets 46, above the arcing plates 58, 59 with three similar strips extending vertically for possibly 12 inches from the first strip 141. As shown in FIG. 13, the center cementing strip 140 extends upwardly from the base strip 141 and the other two strips 142, 143 are displaced inwardly from the ends of the main spaced plate arc stack 12. By way of example, the end strips 142, 143 are spaced inwardly approximately one inch in from the ends of the stack 12. Also the recesses between the lugs on the arc horns 122, 123 and the arc-chute side plates 46, 47 are likewise filled with the epoxy resin. The main interrupting stacks 12 are placed in position, and then the epoxy resin cement is applied in a similar manner to the outside surfaces of the stacks 12. The opposite side sheet 47 is then placed in position and the assembly completed.

It will be noted that with such an arc-chute cementing construction, gases are prevented from rising upwardly along the inside surfaces of the housing side plates 46, 47. Also the gases are prevented by the vertically disposed strips 142, 143 from entering at the ends of the stacks 12 between the stacks 12 and the side sheets 46, 47.

Proper design of magnetic circuit interrupters requires a balance between back pressure in the arc-chute and magnetic field strength. To obtain optimum performance, the arc must travel at a uniform speed up into the plate structure to avoid hot spots; and also, the arc must not reach the ends of the slots too quickly or they will be overheated with consequent reduction in interrupting ability. Physical space and other problems limit the magnetic field strength; and, consequently, the design variable is back pressure. When the balance in the 1,000 mva. breaker was obtained, it was found that the exhaust gases out of the top of the arc-chute were sufficiently ionized that the restored voltage would break down the gases above the arc-chute, and a failure might result. To overcome this problem, the 1,000 mva. design, presently described, uses the end cooling baffle assemblies 76 and the deflectors 82.

When the circuit-interrupting arc-chute assembly 11 was constructed as described, it was possible to permit sufficient freedom of gas passage through the chute to interrupt more than 130% of rating with sufficient diffusion of the exhaust gases that no breakdown occurred.

To permit rotation of the entire arc-chute assembly 11 about the pivot axis 144 (FIG. 1), a transfer-clip assembly, generally designated by the reference numeral 145, is provided interconnecting the inner arc-horn assembly 69 with the relatively stationary contact structure 3.

FIGS. 25–27 show more clearly the transfer-clip assembly. It will be noted that an angle-shaped mounting bracket 146 is provided, having lateral mounting apertures 147. Bolts, not shown, fixedly secure the mounting bracket 146 to the inner walls of the side plates 46, 47. Spring clips 148 are bolted, as at 149, to the bracket 146. The resulting assembly 145, rotates with the arc-chute assembly 11 about the pivot point 144 during maintenance operations when it is desired to raise the arc-chute to inspect the contacts.

With reference to FIG. 27, it will be noted that a U-shaped conducting member 150 is brazed to the outer extremity of the contact support bracket 146, and cooperates with the outward end 151 of the inner arc horn 69 to form a spaced two-part arc-horn assembly.

Figure 11:
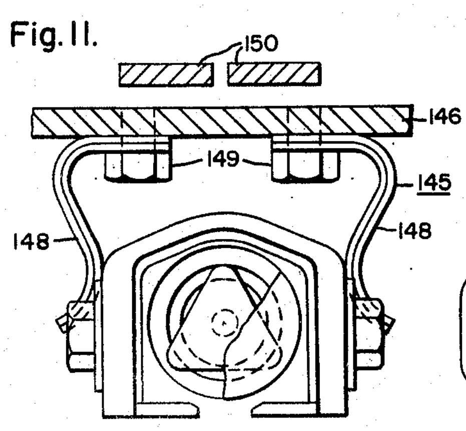
FIG. 11 is a fragmentary, enlarged sectional view of the arc-chute contact-clip assembly utilized in the arc chute of FIG. 1, the view being taken substantially along the line XI—XI of FIG. 12.
Figure 12:
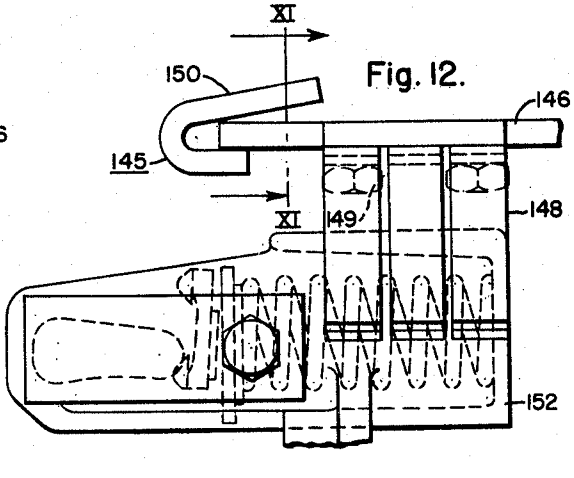
FIG. 12 illustrates, in side elevation, and fragmentarily, the contact spring-clip assembly of FIG. 11.

With reference to FIGS. 11 and 12, it will be noted that the transfer-clip assembly 145 coacts with the contact spring cage, generally designated by the reference numeral 152, and shown in its entirety in FIG. 1 of the drawings. FIG. 11 shows more clearly the contact engagement between the spring clips 148 and the outer sides of the contact spring cage 152. Reference may be had to United States patent application Serial No. 702,576, filed December 13, 1957, by Russell E. Frink, previously referred to for further details of the operation and function of the transfer-clip assembly 145.

From the foregoing description of the invention, it will be apparent that a novel combination of structural features are combined in a unitary arc-chute assembly 11 to facilitate arc movement, and to result in an intensive deconcentration and dispersement of the exhaust arc gases. The entire result of all of the foregoing features results in a novel magnetic air circuit interrupter having an unprecedented rating, namely 1000 mva., at 13.8 kv.

Since the arc-chute structure 11 of the present invention does not need to employ any oil or inflammable liquids, or need to employ any particular gas, it is obvious that the end result, namely of providing an air circuit interrupter of unprecedented rating satisfies a distinct need of the industry for high-capacity magnetic air circuit interrupters.

Although there has been shown and described a specific structure, it is to be clearly understood that the same was merely for the purpose of description, and that changes and modifications may readily be made therein by those skilled in the art without departing from the spirit and scope of the invention.

We claim as our invention:

1. A circuit interrupter including contact means comprising a relatively stationary contact and a cooperable movable contact separable to establish an arc, elongated arc-chute means disposed on one side of said contact means and having spaced side housing plate means into which said arc may be moved to effect its extinction, said elongated arc-chute means having a front portion and a rear portion, an elongated rear arc-horn assembly extending along the rear portion of the arc-chute means and having an inner U-shaped reversed-bend portion immediately adjacent to said relatively stationary contact and disposed between said relatively stationary contact and said arc-chute means to quickly effect arc-terminal transfer thereto, means electrically connecting said reversed-bend portion to the relatively stationary contact, a front elongated arc-horn assembly for said arc-chute means extending along the front portion thereof and having an inner portion, said movable contact being movable adjacent the inner portion of said front elongated arc-horn assembly so that said established arc may quickly transfer to the front arc-horn assembly and move therealong into said arc-chute means, said elongated arc-chute means comprising a number of substantially parallel-disposed, spaced, insulating plate portions having end venting passages therebetween, said plate portions being positioned substantially transversely of the established arc, a plurality of widened exhaust passages spaced at intervals along the length of the arc-chute, each of which has a greater venting capacity than the venting capacity of the normal venting passages between the spaced plate portions, means defining a widened chimney extension for each of a plurality of said widened exhaust passages which extends beyond the outer ends of the insulating plate portions, a plurality of staggered diagonally-extending deflecting plates disposed between the chimney extensions, and registering lateral vent openings provided in the spaced side housing plate means for lateral as well as end dissemination of the exhaust arc gases to prevent restriking across the exhaust end of the arc-chute means.

2. A circuit interrupter including contact means comprising a relatively stationary contact and a cooperable movable contact separable to establish an arc, elongated arc-chute means disposed on one side of said contact means and having spaced side housing plate means into which said arc may be moved to effect its extinction, said elongated arc-chute means having a front portion and a rear portion, an elongated rear arc-horn assembly extending along the rear portion of the arc-chute means and having an inner U-shaped reversed-bend portion immediately adjacent to said relatively stationary contact and disposed between said relatively stationary contact and said arc-chute means to quickly effect arc-terminal transfer thereto, means electrically connecting said reversed-bend portion to the relatively stationary contact, means pivotally mounting said arc-chute means for rotation about a pivot, the inner U-shaped reversed-bend portion of the rear elongated arc-horn assembly having one or more disengageable contact fingers associated therewith for separably engaging the relatively stationary contact to accommodate such pivoting movement, a front elongated arc-horn assembly for said arc-chute means extending along the front portion thereof and having an inner portion, said movable contact being movable adjacent the inner portion of said front elongated arc-horn assembly so that said established arc may quickly transfer to the front arc-horn assembly and move therealong into said arc-chute means, said elongated arc-chute means comprising a number of substantially parallel-disposed, spaced, insulating plate portions having end venting passages therebetween, said plate portions being positioned substantially transversely of the established arc, a plurality of widened exhaust passages spaced at intervals along the length of the arc-chute, each of which has a greater venting capacity than the venting capacity of the normal venting passages between the spaced plate portions, means defining a widened chimney extension for each of a plurality of said widened exhaust passages which extends beyond the outer ends of the insulating plate portions, a plurality of staggered diagonally-extending deflecting plates disposed between the chimney extensions, and registering lateral vent openings provided in the spaced side housing plate means for lateral as well as end dissemination of the exhaust arc gases to prevent restriking across the exhaust end of the arc-chute means.

3. A circuit interrupter including contact means comprising a relatively stationary contact and a cooperable movable contact separable to establish an arc, elongated arc-chute means disposed on one side of said contact means and having spaced side housing plate means into which said arc may be moved to effect its extinction, said elongated arc-chute means having a front portion and a rear portion, an elongated rear arc-horn assembly extending along the rear portion of the arc-chute means and having an inner U-shaped reversed-bend portion immediately adjacent to said relatively stationary contact and disposed between said relatively stationary contact and said arc-chute means to quickly effect arc-terminal transfer thereto, means electrically connecting said reversed-bend portion to the relatively stationary contact, a front elongated arc-horn assembly for said arc-chute means extending along the front portion thereof and having an inner portion, said movable contact being movable adjacent the inner portion of said front elongated arc-horn assembly so that said established arc may quickly transfer to the front arc-horn assembly and move therealong into said arc-chute means, said elongated arc-chute means comprising a number of substantially parallel-disposed, spaced, insulating plate portions having end venting passages therebetween, said plate portions being positioned substantially transversely of the established arc, a plurality of widened exhaust passages spaced at intervals along the length of the arc-chute, each of which has a greater venting capacity than the venting capacity of the normal venting passages between the spaced plate portions, means defining a widened chimney extension for each of a plurality of said widened exhaust passages which extends beyond the outer ends of the insulating plate portions, a plurality of staggered diagonally-extending deflecting plates disposed between the chimney extensions, registering lateral vent openings provided in the spaced side housing plate means for lateral as well as end dissemination of the exhaust arc gases to prevent restriking across the exhaust end of the arc-chute means, the arc-chute means being positioned vertically for taking advantage of natural convection flow, and there existing combined upward and horizontal lateral venting of the exhaust arc gases.

4. A circuit interrupter including contact means comprising a relatively stationary contact and a cooperable movable contact separable to establish an arc, elongated arc-chute means disposed on one side of said contact means and having spaced side housing plate means into which said arc may be moved to effect its extinction, said elongated arc-chute means having a front portion and a rear portion, an elongated rear arc-horn assembly extending along the rear portion of the arc-chute means and having an inner U-shaped reversed-bend portion immediately adjacent to said relatively stationary contact and disposed between said relatively stationary contact and said arc-chute means to quickly effect arc-terminal transfer thereto, means electrically connecting said reversed-bend portion to the relatively stationary contact, the rear elongated arc-horn assembly being a two-piece assembly, a front elongated arc-horn assembly for said arc-chute means extending along the front portion thereof and having an inner portion, said movable contact being movable adjacent the inner portion of said front elongated arc-horn assembly so that said established arc may quickly transfer to the front arc-horn assembly and move therealong into said arc-chute means, said elongated arc-chute means comprising a number of substantially parallel-disposed, spaced, insulating plate portions having end venting passages therebetween, said plate portions being positioned substantially transversely of the established arc, a plurality of widened exhaust passages spaced at intervals along the length of the arc-chute, each of which has a greater venting capacity than the venting capacity of the normal venting passages between the spaced plate portions, means defining a widened chimney extension for each of a plurality of said widened exhaust passages which extends beyond the outer ends of the insulating plate portions, a plurality of staggered diagonally-extending deflecting plates disposed between the chimney extensions, and registering lateral vent openings provided in the spaced side housing plate means for lateral as well as end dissemination of the exhaust arc gases to prevent restriking across the exhaust end of the arc-chute means.

5. A circuit interrupter including contact means comprising a relatively stationary contact and a cooperable movable contact separable to establish an arc, elongated arc-chute means disposed on one side of said contact means and having spaced side housing plate means into which said arc may be moved to effect its extinction, said elongated arc-chute means having a front portion and a rear portion, an elongated rear arc-horn assembly extending along the rear portion of the arc-chute means and having an inner U-shaped reversed-bend portion immediately adjacent to said relatively stationary contact and disposed between said relatively stationary contact and said arc-chute means to quickly effect arc-terminal transfer therto, means electrically connecting said reversed-bend portion to the relatively stationary contact, a front elongated arc-horn assembly for said arc-chute means extending along the front portion thereof and having an inner portion, said movable contact being movable adjacent the inner portion of said front portion of said front elongated arc-horn assembly so that said established arc may quickly transfer to the front arc-horn assembly and move therealong into said arc-chute means, said elongated arc-chute means comprising a number of substantially parallel-disposed, spaced, insulating plate portions having end venting passages therebetween, said plate portions being positioned substantially transversely of the established arc, a plurality of widened exhaust passages spaced at intervals along the length of the arc-chute, each of which has a greater venting capacity than the venting capacity of the normal venting passages between the spaced plate portions, means defining a widened chimney extension for each of a plurality of said widened exhaust passages which extends beyond the outer ends of the insulating plate portions, a plurality of staggered diagonally-extending deflecting plates disposed between the chimney extensions, registering lateral vent openings provided in the spaced side housing plate means for lateral as well as end dissemination of the exhaust arc gases to prevent restriking across the exhaust end of the arc-chute means, and the staggered diagonally-extending deflecting plates being fixedly secured to the side housing plate means.

References Cited in the file of this patent

UNITED STATES PATENTS

| | | |
|---|---|---|
| 2,442,199 | Dickinson et al. | May 25, 1948 |
| 2,697,154 | Strom | Dec. 14, 1954 |
| 2,708,698 | Ainsworth | May 17, 1955 |
| 2,739,205 | Florschutz et al. | Mar. 20, 1956 |
| 2,750,476 | Latour | June 12, 1956 |
| 2,795,675 | Frink | June 11, 1957 |
| 2,816,992 | Frink | Dec. 17, 1957 |
| 2,820,122 | Teszner | Jan. 14, 1958 |
| 2,871,318 | Frink | Jan. 27, 1959 |
| 2,889,433 | Kozlovic | June 2, 1959 |
| 2,970,197 | Frink | Jan. 31, 1961 |

FOREIGN PATENTS

| | | |
|---|---|---|
| 715,121 | Great Britain | Sept. 8, 1954 |